United States Patent
Tremblay et al.

(10) Patent No.: US 7,490,228 B2
(45) Date of Patent: *Feb. 10, 2009

(54) PROCESSOR WITH REGISTER DIRTY BIT TRACKING FOR EFFICIENT CONTEXT SWITCH

(75) Inventors: Marc Tremblay, Menlo Park, CA (US); William Joy, Aspen, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 11/369,212

(22) Filed: Mar. 6, 2006

(65) Prior Publication Data

US 2006/0242388 A1    Oct. 26, 2006

Related U.S. Application Data

(63) Continuation of application No. 09/812,733, filed on Mar. 19, 2001, now Pat. No. 7,010,674, which is a continuation of application No. 09/204,586, filed on Dec. 3, 1998, now Pat. No. 6,205,543.

(51) Int. Cl.
*G06F 9/40* (2006.01)
(52) U.S. Cl. .................................................. 712/228
(58) Field of Classification Search ............... 710/206; 712/245, 244, 228; 711/144, 141
See application file for complete search history.

(56) References Cited

U.S. PATENT DOCUMENTS

| | | | | |
|---|---|---|---|---|
| 5,127,098 A | * | 6/1992 | Rosenthal et al. | 711/202 |
| 5,764,943 A | * | 6/1998 | Wechsler | 712/218 |
| 5,778,248 A | * | 7/1998 | Leung | 712/23 |
| 5,987,258 A | * | 11/1999 | Daniel et al. | 717/124 |
| 6,145,049 A | * | 11/2000 | Wong | 710/267 |
| 6,237,083 B1 | * | 5/2001 | Favor | 712/217 |
| 6,408,325 B1 | * | 6/2002 | Shaylor | 718/108 |
| 6,470,433 B1 | * | 10/2002 | Prouty et al. | 711/168 |
| 6,470,443 B1 | * | 10/2002 | Emer et al. | 712/205 |
| 6,671,762 B1 | * | 12/2003 | Soni et al. | 710/267 |

* cited by examiner

*Primary Examiner*—David Y Eng
(74) *Attorney, Agent, or Firm*—Osha •Liang LLP

(57) ABSTRACT

A processor including a large register file utilizes a dirty bit storage coupled to the register file and a dirty bit logic that controls resetting of the dirty bit storage. The dirty bit logic determines whether a register or group of registers in the register file has been written since the process was loaded or the context was last restored and, if written generates a value in the dirty bit storage that designates the written condition of the register or group of registers. When the context is next saved, the dirty bit logic saves a particular register or group of registers when the dirty bit storage indicates that a register or group of registers was written. If the register or group of registers was not written, the context is switched without saving the register or group of registers. The dirty bit storage is initialized when a process is loaded or the context changes.

16 Claims, 13 Drawing Sheets

| Register name | width | address specifier | user access | supervisor access | thread state |
|---|---|---|---|---|---|
| PSR | 8 | 010_0001 | no | rd/wr | yes |
| TPSR1 | 8 | 010_0010 | no | " | yes |
| TPSR2 | 8 | 010_0011 | no | " | yes |
| PCR | 7 | 010_0000 | no | " | no |
| TL | 2 | 010_0100 | no | " | no |
| TICK | 32 | 010_0101 | read only | " | no |
| TVALUE | 32 | 010_0110 | no | " | no |
| TCNTL | 8 | 010_0111 | no | " | no |
| GX | 13 | 001_0000 | no | rd only | yes |
| INT | 7 | 010_1000 | no | rd/wr | yes |
| FSR | 16 | 001_0001 | rd/wr | " | yes |
| FMT | 2 | 010_1010 | rd/wr | rd/wr | yes |
| DIRTY | 6 | 010_1011 | rd/wr | " | yes |
| INT_OTHER | — | 010_1001 | no | wr only | yes |

*FIG. 9*

| PCR | PCR | Description | Initial value | After a trap |
|---|---|---|---|---|
| [0] | POW | power management | 0 (off) | N/C not changed |
| [1] | ICE | icache enable | 0 | ″ |
| [2] | DCE | dcache enable | 0 | ″ |
| [3] | BPTE | branch predict taken enable | 0 | ″ |
| [4] | PE | pipeline enable | 0 | ″ |
| [5] | MSTEP | memory step | 0 | ″ |
| [6] | PID | processor ID | hardwired | hardwired |

FIG. 10

| Instruction | Instruction |
|---|---|
| vliw_1 | setir ra, PSR |
| vliw_2 | ld_2 [r1+r2], r3 |
| vliw_3 | ld_3 |
| vliw_4 | ld_4 |
| vliw_5 | ld_5 |
| vliw_6 | ld_6 |

FIG. 11A

| cycle | 1 | 2 | 3 | 4 | 5 | 6 | 7 | 8 | 9 | 10 | 11 | 12 |
|---|---|---|---|---|---|---|---|---|---|---|---|---|
| setir | D | E | A1 | A2 | A3 | T | WB | | | | | |
| ld_2 | | D | E | A1 | A2 | A3 | T | WB | | | | |
| ld_6 | | | | | | D | E | E | | | | |
| ld_7 | | | | | | | | | | | | |

FIG. 11B

| Instruction | Instruction |
|---|---|
| vliw_1 | setir ra, PCR |
| vliw_2 | inst 2 |
| vliw_3 | inst 3 |
| vliw_4 | inst 4 |
| vliw_5 | inst 5 |
| vliw_6 | inst 6 |
| vliw_7 | inst 7 |
| vliw_8 | inst 8 |
| vliw_9 | setir rb, PSR |
| vliw_10 | inst 10 |
| vliw_11 | inst 11 |

FIG. 12A

| cycle | 1 | 2 | 3 | 4 | 5 | 6 | 7 | 8 | 9 | 10 | 11 | 12 | 13 |
|---|---|---|---|---|---|---|---|---|---|---|---|---|---|
| setir | T | WB | | | | | | | | | | | |
| inst7 | | D | D | E | A1 | A2 | A3 | T | WB | | | | |
| inst8 | | | | D | D | D | D | D | D | D | E | A1 | A2 |
| setir | | | | | | | | | | | D | D | D |
| iST | | ST | | ST | ST | ST | ST | ST | ST | | ST | ST | ST |

| cycle | 14 | 15 | 16 | 17 | 18 | 19 | 20 | 21 | 22 | 23 | 24 | 25 | 26 |
|---|---|---|---|---|---|---|---|---|---|---|---|---|---|
| inst8 | A3 | T | WB | | | | | | | | | | |
| setir | D | D | D | D | E | A1 | A2 | A3 | T | WB | | | |
| inst10 | | | | | D | D | D | D | D | D | E | A1 | A2 |
| inst11 | | | | | | | | | | | D | E | A1 |
| ST | ST | ST | ST | | ST | ST | ST | ST | ST | | | | |

FIG. 12B

| Instruction | Unit | rd [6:5] |
|---|---|---|
| [0] | all | 01 |
| [1] | all | 10 |
| [2] | gfu | 11 |
| [3] | mfu1 | 11 |
| [4] | mfu2 | 11 |
| [5] | mfu3 | 11 |

FIG. 13

PROCESSOR WITH REGISTER DIRTY BIT TRACKING FOR EFFICIENT CONTEXT SWITCH

CROSS-REFERENCE TO RELATED APPLICATION(S)

The present application is a continuation of U.S. patent application Ser. No. 09/812,733, filed Mar. 19, 2001, which is itself a continuation of U.S. patent application Ser. No. 09/204,586, filed Dec. 3, 1998, now U.S. Pat. No. 6,205,543. The entireties of application Ser. Nos. 09/812,733 and 09/204,586 are incorporated herein by reference.

The present application is related to subject matter disclosed in the following: U.S. patent application Ser. No. 09/204,480, filed Jul. 30, 2001, now U.S. Pat. No. 6,718,457; U.S. patent application Ser. No. 09/204,584, filed Dec. 3, 1998, now U.S. Pat. No. 6,615,338, U.S. patent application Ser. No. 09/204,481, filed Dec. 3, 1998, now U.S. Pat. No. 6,343,348, U.S. patent application Ser. No. 09/204,536, filed Dec. 3, 1998; U.S. patent application Ser. No. 09/205,121, filed Dec. 3, 1998, now U.S. Pat. No. 6,321,325, U.S. patent application Ser. No. 09/204,781, filed Dec. 3, 1998, now U.S. Pat. No. 6,249,861, U.S. patent application Ser. No. 09/204,535, filed Dec. 3, 1998, now U.S. Pat. No. 6,279,100, application Ser. No. 09/204,585, filed Dec. 3, 1998; and application Ser. No. 09/204,479, filed Dec. 3, 1998.

BACKGROUND

1. Field of the Invention

The present invention relates to storage or memory in a processor. More specifically, the present invention relates to a register file storage for a multiprogramming processor including structures and techniques for handling context switching.

2. Description of the Related Art

One technique for improving the performance of processors is parallel execution of multiple instructions to allow the instruction execution rate to exceed the clock rate. Various types of parallel processors have been developed including Very Long Instruction Word (VLIW) processors that use multiple, independent functional units to execute multiple instructions in parallel. VLIW processors package multiple operations into one very long instruction, the multiple operations being determined by sub-instructions that are applied to the independent functional units.

The multiple functional units are kept busy by maintaining a code sequence with sufficient operations to keep instructions scheduled. A VLIW processor often uses a technique called trace scheduling to maintain scheduling efficiency by unrolling loops and scheduling code across basic function blocks. Trace scheduling also improves efficiency by allowing instructions to move across branch points.

A register file with a large number of registers is often used to increase performance of a VLIW processor. A VLIW processor is typically implemented as a deeply pipelined engine with an "in-order" execution model. To attain a high performance a large number of registers is utilized so that the multiple functional units are busy as often as possible.

A large register file has many advantages but also has several drawbacks. For example, as the number of registers that are directly addressable is increased, the number of bits used in the instruction also increases. For a rich instruction set architecture with, for example, four register specifiers, an additional bit for a register specifier effectively costs four bits in the instruction (one bit per register specifier). Also, a register file with many registers occupies a large area. Furthermore, a register file with many registers may create critical timing paths and therefore limit the cycle time of the processor.

Another disadvantage of a large register file relates to the handling of registers during context switching of a multiprogrammed processor. A multiprogrammed processor is executable with several processes sharing the processing units concurrently. In any given clock cycle, only a single process has instructions executing on the processing units. The multiple processes execute concurrently by timesharing both the processing units and the memory, including the register file. When the context of the processor switches, the internal state of the processor, including all state information for an executing first process, is saved into a memory, and then state information for a saved second process is restored into an executing state. A processor with a large register file incurs a large overhead during context switching since the values for the first process that are held in a large number of registers are shifted from the register file to a context storage, followed by shifting of values for the second process from a context storage to the register file. The overhead of context switching reduces the time during which the processor executes instructions, reducing the efficiency of the processor.

What is needed is a technique and structure that improve the efficiency of context switching in a multiprogrammed processor that has a large register file.

SUMMARY OF THE INVENTION

A processor including a large register file utilizes a dirty bit storage coupled to the register file and a dirty bit logic that controls resetting of the dirty bit storage. The dirty bit logic determines whether a register or group of registers in the register file has been written since the process was loaded or the context was last restored and, if written generates a value in the dirty bit storage that designates the written condition of the register or group of registers. When the context is next saved, the dirty bit logic saves a particular register or group of registers when the dirty bit storage indicates that a register or group of registers was written. If the register or group of registers was not written, the context is switched without saving the register or group of registers. The dirty bit storage is initialized when a process is loaded or the context changes.

In some embodiments, the dirty bit logic accesses a destination register (rd) field of an instruction and classifies the destination register rd according to the address in the rd field. The classification corresponds to a bit in the dirty bit storage and the bit is evaluated to designate that the particular classification includes a register that is written by the instruction.

In an illustrative embodiment, a Very Long Instruction Word (VLIW) processor has a plurality of functional units and includes a dirty bit storage, a dirty bit logic, and a multi-ported register file that is divided into a plurality of separate register file segments. Each of the register file segments is associated to one of the plurality of functional units. The register file segments are partitioned into local registers and global registers. The global registers are read and written by all functional units. The local registers are read and written only by a functional unit associated with a particular register file segment. The local registers and global registers are addressed using register addresses in an address space that is separately defined for a register file segment/functional unit pair. The global registers are addressed within a selected global register range using the same register addresses for the plurality of register file segment/functional unit pairs. The local registers in a register file segment are addressed using register addresses in a local register range outside the global register range that are assigned within a single register file segment/functional unit pair. Register addresses in the local register range are the same for the plurality of register file segment/functional unit pairs and address registers locally within a register file segment/functional unit pair. The dirty bit logic accesses a destination register (rd) field of an instruction and classifies the destination register rd according to the address in the rd field. The classification corresponds to a bit in the dirty bit storage and the bit is evaluated to designate that the particular classification includes a register that is written by the instruction. In one example, the dirty bit logic classifies the register file into several groups of registers including a plurality of register groups within the global register range and one or more register groups in the individual local register groups. In another example, the dirty bit logic classifies the register file into a plurality of registers including a plurality of register groups within the global register range and one register group that includes all of the local register groups.

In accordance with an additional aspect of the present invention, a processor including a large register file utilizes a dirty bit storage coupled to the register file, a dirty bit enable storage, and a dirty bit logic that controls resetting of the dirty bit storage. The dirty bit logic determines whether a register or group of registers in the register file has been written since the context was last restored and, if written generates a value in the dirty bit storage that designates the written condition of the register or group of registers. When the context is next saved, the dirty bit logic saves a particular register or group of registers when the dirty bit storage indicates that a register or group of registers was written. The dirty bit enable storage is used to enable or disable the dirty bit operation on a group-by-group basis within the register file. The dirty bit enable storage has a bit that corresponds to each of the bits in the dirty bit storage. The dirty bit enable storage has bit values that are programmed to disable or enable access to the register or group of registers that correspond to each bit. In some embodiments, the dirty bit enable storage is a privileged register that is written only by privileged software to enable or disable segments of the register file. The dirty bit logic detects both read and write accesses directed to the register or register groups. If the dirty bit enable storage bit values enable access to the register or register groups, the access is allowed. Otherwise, access to the register or register group is disabled and the dirty bit logic responds to either read or write accesses by generating a trap or exception for servicing by the processor.

BRIEF DESCRIPTION OF THE DRAWINGS

The features of the described embodiments are specifically set forth in the appended claims. However, embodiments of the invention relating to both structure and method of operation, may best be understood by referring to the following description and accompanying drawings.

FIG. 9 is a table lists the internal registers of the pipeline control unit.

FIG. 10 is a table showing contents of a Processor Control Register (PCR).

FIGS. 11A and 11B are an instruction table and a pipeline diagram respectively showing operation of the processor while instructions that affect the MSTEP bit are executed.

FIGS. 12A and 12B respectively show an instruction table and pipeline diagram illustrating operation of the Pipeline Control Register PE bit.

FIG. 13 is a table illustrating entries of a dirty register.

The use of the same reference symbols in different drawings indicates similar or identical items.

DESCRIPTION OF THE EMBODIMENT(S)

Figure 1:
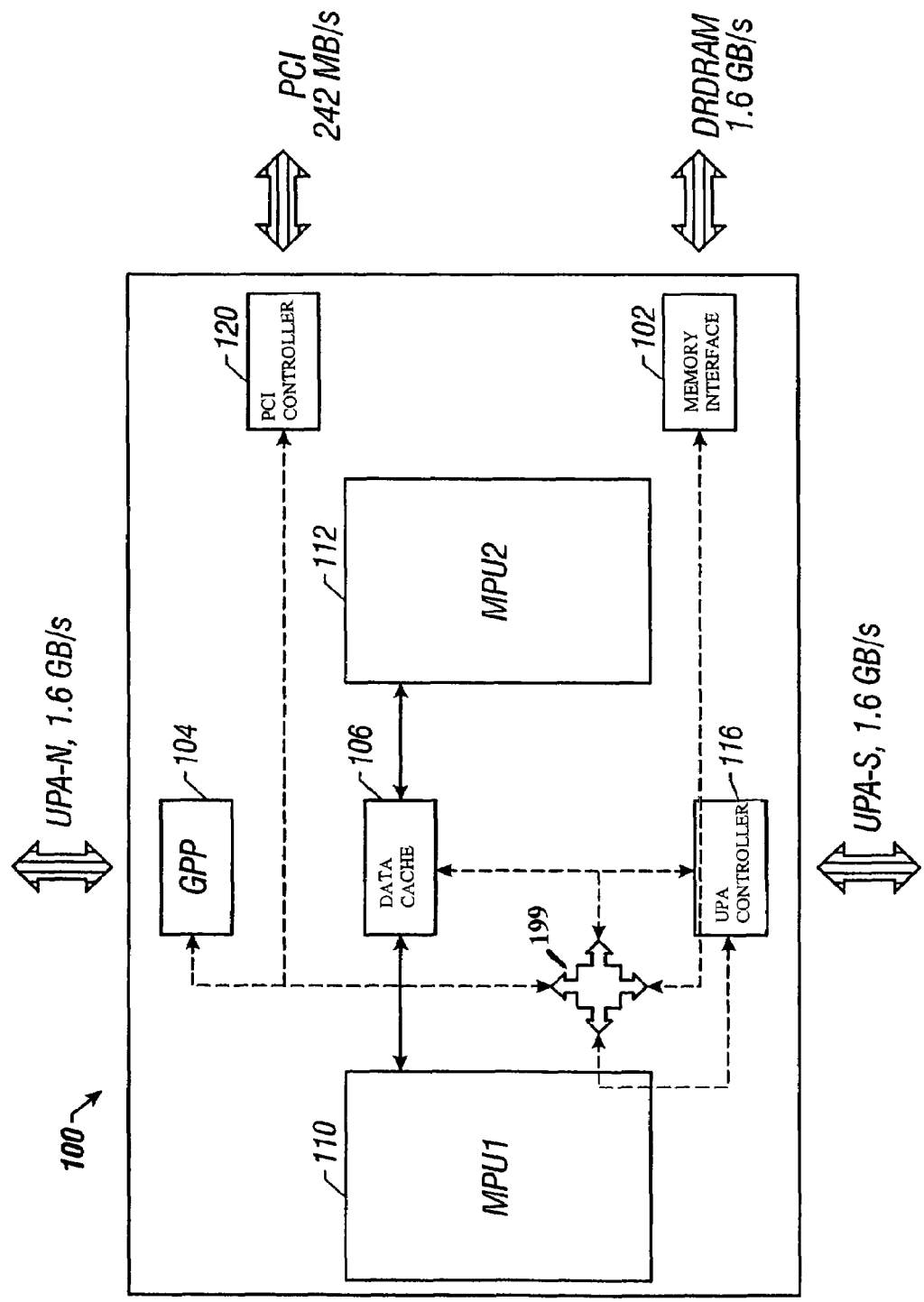
FIG. 1 is a schematic block diagram illustrating a single integrated circuit chip implementation of a processor in accordance with an embodiment of the present invention.

Referring to FIG. 1, a schematic block diagram illustrates a single integrated circuit chip implementation of a processor 100 that includes a memory interface 102, a geometry decompressor 104, two media processing units 110 and 112, a shared data cache 106, and several interface controllers. The interface controllers support an interactive graphics environment with real-time constraints by integrating fundamental components of memory, graphics, and input/output bridge functionality on a single die. The components are mutually linked and closely linked to the processor core with high bandwidth, low-latency communication channels 199 to manage multiple high-bandwidth data streams efficiently and with a low response time. The interface controllers include a an UltraPort Architecture Interconnect (UPA) controller 116 and a peripheral component interconnect (PCI) controller 120. The illustrative memory interface 102 is a direct Rambus dynamic RAM (DRDRAM) controller. The shared data cache 106 is a dual-ported storage that is shared among the media processing units 110 and 112 with one port allocated to each media processing unit. The data cache 106 is four-way set associative, follows a write-back protocol, and supports hits in the fill buffer (not shown). The data cache 106 allows fast data sharing and eliminates the need for a complex, error-prone cache coherency protocol between the media processing units 110 and 112.

The UPA controller 116 is a custom interface that attains a suitable balance between high-performance computational and graphic subsystems. The UPA is a cache-coherent, processor-memory interconnect. The UPA attains several advantageous characteristics including a scaleable bandwidth through support of multiple bused interconnects for data and addresses, packets that are switched for improved bus utilization, higher bandwidth, and precise interrupt processing.

The UPA performs low latency memory accesses with high throughput paths to memory. The UPA includes a buffered cross-bar memory interface for increased bandwidth and improved scaleability. The UPA supports high-performance graphics with two-cycle single-word writes on the 64-bit UPA interconnect. The UPA interconnect architecture utilizes point-to-point packet switched messages from a centralized system controller to maintain cache coherence. Packet switching improves bus bandwidth utilization by removing the latencies commonly associated with transaction-based designs.

The PCI controller 120 is used as the primary system I/O interface for connecting standard, high-volume, low-cost peripheral devices, although other standard interfaces may also be used. The PCI bus effectively transfers data among high bandwidth peripherals and low bandwidth peripherals, such as CD-ROM players, DVD players, and digital cameras.

Two media processing units 110 and 112 are included in a single integrated circuit chip to support an execution environment exploiting thread level parallelism in which two independent threads can execute simultaneously. The threads may arise from any sources such as the same application, different applications, the operating system, or the runtime environment. Parallelism is exploited at the thread level since parallelism is rare beyond four, or even two, instructions per cycle in general purpose code. For example, the illustrative processor 100 is an eight-wide machine with eight execution units for executing instructions. A typical "general-purpose" processing code has an instruction level parallelism of about two so that, on average, most (about six) of the eight execution units would be idle at any time. The illustrative processor 100 employs thread level parallelism and operates on two independent threads, possibly attaining twice the performance of a processor having the same resources and clock rate but utilizing traditional non-thread parallelism.

Thread level parallelism is particularly useful for Java™ applications which are bound to have multiple threads of execution. Java™ methods including "suspend", "resume", "sleep", and the like include effective support for threaded program code. In addition, Java™ class libraries are thread-safe to promote parallelism. (Java™, Sun, Sun Microsystems and the Sun Logo are trademarks or registered trademarks of Sun Microsystems, Inc. in the United States and other countries. All SPARC trademarks, including UltraSPARC I and UltraSPARC II, are used under license and are trademarks of SPARC International, Inc. in the United States and other countries. Products bearing SPARC trademarks are based upon an architecture developed by Sun Microsystems, Inc.) Furthermore, the thread model of the processor 100 supports a dynamic compiler which runs as a separate thread using one media processing unit 110 while the second media processing unit 112 is used by the current application. In the illustrative system, the compiler applies optimizations based on "on-the-fly" profile feedback information while dynamically modifying the executing code to improve execution on each subsequent run. For example, a "garbage collector" may be executed on a first media processing unit 110, copying objects or gathering pointer information, while the application is executing on the other media processing unit 112.

Although the processor 100 shown in FIG. 1 includes two processing units on an integrated circuit chip, the architecture is highly scaleable so that one to several closely-coupled processors may be formed in a message-based coherent architecture and resident on the same die to process multiple threads of execution. Thus, in the processor 100, a limitation on the number of processors formed on a single die thus arises from capacity constraints of integrated circuit technology rather than from architectural constraints relating to the interactions and interconnections between processors.

Figure 2:
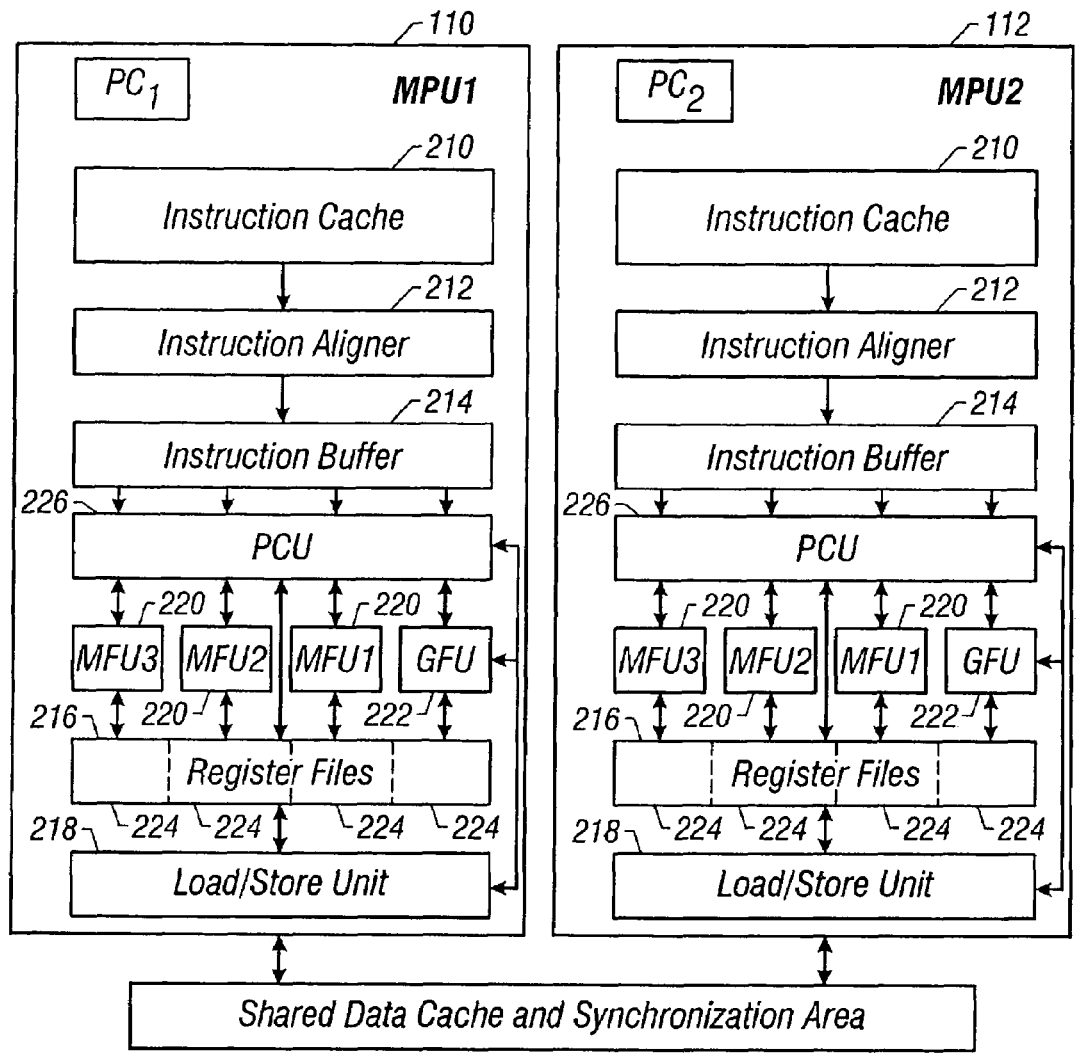
FIG. 2 is a schematic block diagram showing the core of the processor.

Referring to FIG. 2, a schematic block diagram shows the core of the processor 100. The media processing units 110 and 112 each include an instruction cache 210, an instruction aligner 212, an instruction buffer 214, a pipeline control unit 226, a split register file 216, a plurality of execution units, and a load/store unit 218. In the illustrative processor 100, the media processing units 110 and 112 use a plurality of execution units for executing instructions. The execution units for a media processing unit 110 include three media functional units (MFU) 220 and one general functional unit (GFU) 222. The media functional units 220 are multiple single-instruction-multiple-datapath (MSIMD) media functional units. Each of the media functional units 220 is capable of processing parallel 16-bit components. Various parallel 16-bit operations supply the single-instruction-multiple-datapath capability for the processor 100 including add, multiply-add, shift, compare, and the like. The media functional units 220 operate in combination as tightly-coupled digital signal processors (DSPs). Each media functional unit 220 has an separate and individual sub-instruction stream, but all three media functional units 220 execute synchronously so that the subinstructions progress lock-step through pipeline stages.

The general functional unit 222 is a RISC processor capable of executing arithmetic logic unit (ALU) operations, loads and stores, branches, and various specialized and esoteric functions such as parallel power operations, reciprocal square root operations, and many others. The general functional unit 222 supports less common parallel operations such as the parallel reciprocal square root instruction.

The illustrative instruction cache 210 has a 16 Kbyte capacity and includes hardware support to maintain coherence, allowing dynamic optimizations through self-modifying code. Software is used to indicate that the instruction storage is being modified when modifications occur. The 16 K capacity is suitable for performing graphic loops, other multimedia tasks or processes, and general-purpose Java™ code. Coherency is maintained by hardware that supports write-through, non-allocating caching. Self-modifying code is supported through explicit use of "store-to-instruction-space" instructions store2i. Software uses the store2i instruction to maintain coherency with the instruction cache 210 so that the instruction caches 210 do not have to be snooped on every single store operation issued by the media processing unit 110.

The pipeline control unit 226 is connected between the instruction buffer 214 and the functional units and schedules the transfer of instructions to the functional units. The pipeline control unit 226 also receives status signals from the functional units and the load/store unit 218 and uses the status signals to perform several control functions. The pipeline control unit 226 maintains a scoreboard, generates stalls and bypass controls. The pipeline control unit 226 also generates traps and maintains special registers.

Each media processing unit 110 and 112 includes a split register file 216, a single logical register file including 128 thirty-two bit registers. The split register file 216 is split into a plurality of register file segments 224 to form a multi-ported structure that is replicated to reduce the integrated circuit die area and to reduce access time. A separate register file segment 224 is allocated to each of the media functional units 220 and the general functional unit 222. In the illustrative embodiment, each register file segment 224 has 128 32-bit registers. The first 96 registers (0-95) in the register file segment 224 are global registers. All functional units can write to the 96 global registers. The global registers are coherent across all functional units (MFU and GFU) so that any write operation to a global register by any functional unit is broadcast to all register file segments 224. Registers 96-127 in the register file segments 224 are local registers. Local registers allocated to a functional unit are not accessible or "visible" to other functional units.

The media processing units 110 and 112 are highly structured computation blocks that execute software-scheduled data computation operations with fixed, deterministic and relatively short instruction latencies, operational characteristics yielding simplification in both function and cycle time. The operational characteristics support multiple instruction issue through a pragmatic very large instruction word (VLIW) approach that avoids hardware interlocks to account for software that does not schedule operations properly. Such hardware interlocks are typically complex, error-prone, and create multiple critical paths. A VLIW instruction word always includes one instruction that executes in the general functional unit (GFU) 222 and from zero to three instructions that execute in the media functional units (MFU) 220. A MFU instruction field within the VLIW instruction word includes an operation code (opcode) field, three source register (or immediate) fields, and one destination register field.

Instructions are executed in-order in the processor 100 but loads can finish out-of-order with respect to other instructions and with respect to other loads, allowing loads to be moved up in the instruction stream so that data can be streamed from main memory. The execution model eliminates the usage and overhead resources of an instruction window, reservation stations, a re-order buffer, or other blocks for handling instruction ordering. Elimination of the instruction ordering structures and overhead resources is highly advantageous since the eliminated blocks typically consume a large portion of an integrated circuit die. For example, the eliminated blocks consume about 30% of the die area of a Pentium II processor.

To avoid software scheduling errors, the media processing units 110 and 112 are high-performance but simplified with respect to both compilation and execution. The media processing units 110 and 112 are most generally classified as a simple 2-scalar execution engine with full bypassing and hardware interlocks on load operations. The instructions include loads, stores, arithmetic and logic (ALU) instructions, and branch instructions so that scheduling for the processor 100 is essentially equivalent to scheduling for a simple 2-scalar execution engine for each of the two media processing units 110 and 112.

The processor 100 supports full bypasses between the first two execution units within the media processing unit 110 and 112 and has a scoreboard in the general functional unit 222 for load operations so that the compiler does not need to handle nondeterministic latencies due to cache misses. The processor 100 scoreboards long latency operations that are executed in the general functional unit 222, for example a reciprocal square-root operation, to simplify scheduling across execution units. The scoreboard (not shown) operates by tracking a record of an instruction packet or group from the time the instruction enters a functional unit until the instruction is finished and the result becomes available. A VLIW instruction packet contains one GFU instruction and from zero to three MFU instructions. The source and destination registers of all instructions in an incoming VLIW instruction packet are checked against the scoreboard. Any true dependencies or output dependencies stall the entire packet until the result is ready. Use of a scoreboarded result as an operand causes instruction issue to stall for a sufficient number of cycles to allow the result to become available. If the referencing instruction that provokes the stall executes on the general functional unit 222 or the first media functional unit 220, then the stall only endures until the result is available for intra-unit bypass. For the case of a load instruction that hits in the data cache 106, the stall may last only one cycle. If the referencing instruction is on the second or third media functional units 220, then the stall endures until the result reaches the write-back stage in the pipeline where the result is bypassed in transmission to the split register file 216.

The scoreboard automatically manages load delays that occur during a load hit. In an illustrative embodiment, all loads enter the scoreboard to simplify software scheduling and eliminate NOPs in the instruction stream.

The scoreboard is used to manage most interlocks between the general functional unit 222 and the media functional units 220. All loads and non-pipelined long-latency operations of the general functional unit 222 are scoreboarded. The long-latency operations include division idiv,fdiv instructions, reciprocal square root frecsqrt,precsqrt instructions, and power ppower instructions. None of the results of the media functional units 220 is scoreboarded. Non-scoreboarded results are available to subsequent operations on the functional unit that produces the results following the latency of the instruction.

The illustrative processor 100 has a rendering rate of over fifty million triangles per second without accounting for operating system overhead. Therefore, data feeding specifications of the processor 100 are far beyond the capabilities of cost-effective memory systems. Sufficient data bandwidth is achieved by rendering of compressed geometry using the geometry decompressor 104, an on-chip real-time geometry decompression engine. Data geometry is stored in main memory in a compressed format. At render time, the data geometry is fetched and decompressed in real-time on the integrated circuit of the processor 100. The geometry decompressor 104 advantageously saves memory space and memory transfer bandwidth. The compressed geometry uses an optimized generalized mesh structure that explicitly calls out most shared vertices between triangles, allowing the processor 100 to transform and light most vertices only once. In a typical compressed mesh, the triangle throughput of the transform-and-light stage is increased by a factor of four or more over the throughput for isolated triangles. For example, during processing of triangles, multiple vertices are operated upon in parallel so that the utilization rate of resources is high, achieving effective spatial software pipelining. Thus operations are overlapped in time by operating on several vertices simultaneously, rather than overlapping several loop iterations in time. For other types of applications with high instruction level parallelism, high trip count loops are software-pipelined so that most media functional units 220 are fully utilized.

Figure 3:
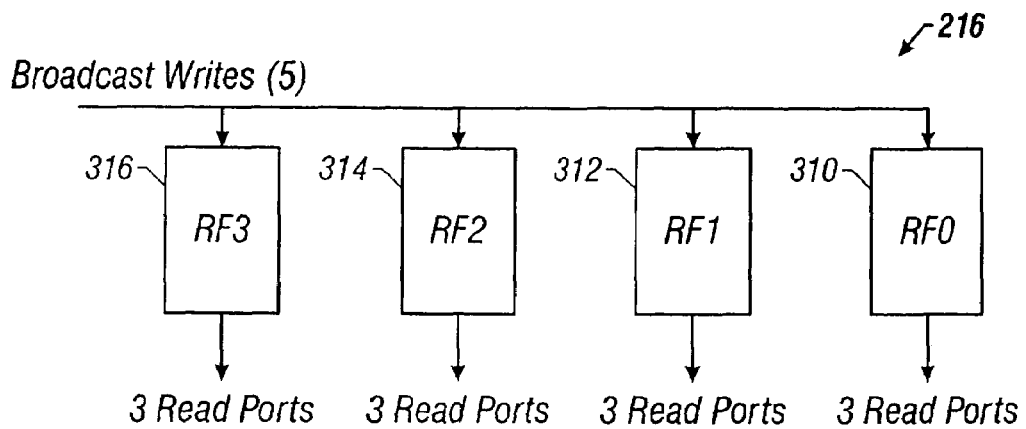
FIG. 3 is a schematic block diagram that illustrates an embodiment of the split register file that is suitable for usage in the processor.

Referring to FIG. 3, a schematic block diagram illustrates an embodiment of the split register file 216 that is suitable for usage in the processor 100. The split register file 216 supplies all operands of processor instructions that execute in the media functional units 220 and the general functional units 222 and receives results of the instruction execution from the execution units. The split register file 216 operates as an interface to the geometry decompressor 104. The split register file 216 is the source and destination of store and load operations, respectively.

In the illustrative processor 100, the split register file 216 in each of the media processing units 110 and 112 has 128 registers. Graphics processing places a heavy burden on register usage. Therefore, a large number of registers is supplied by the split register file 216 so that performance is not limited by loads and stores or handling of intermediate results including graphics "fills" and "spills". The illustrative split register file 216 includes twelve read ports and five write ports, supplying total data read and write capacity between the central registers of the split register file 216 and all media functional units 220 and the general functional unit 222. The five write ports include one 64-bit write port that is dedicated to load operations. The remaining four write ports are 32 bits wide and are used to write operations of the general functional unit 222 and the media functional units 220.

Total read and write capacity promotes flexibility and facility in programming both of hand-coded routines and compiler-generated code.

Large, multiple-ported register files are typically metal-limited so that the register area is proportional with the square of the number of ports. A sixteen port file is roughly proportional in size and speed to a value of 256. The illustrative split register file 216 is divided into four register file segments 310, 312, 314, and 316, each having three read ports and four write ports so that each register file segment has a size and speed proportional to 49 for a total area for the four segments that is proportional to 196. The total area is therefore potentially smaller and faster than a single central register file. Write operations are fully broadcast so that all files are maintained coherent. Logically, the split register file 216 is no different from a single central register file However, from the perspective of layout efficiency, the split register file 216 is highly advantageous, allowing for reduced size and improved performance.

The new media data that is operated upon by the processor 100 is typically heavily compressed. Data transfers are communicated in a compressed format from main memory and input/output devices to pins of the processor 100, subsequently decompressed on the integrated circuit holding the processor 100, and passed to the split register file 216.

Splitting the register file into multiple segments in the split register file 216 in combination with the character of data accesses in which multiple bytes are transferred to the plurality of execution units concurrently, results in a high utilization rate of the data supplied to the integrated circuit chip and effectively leads to a much higher data bandwidth than is supported on general-purpose processors. The highest data bandwidth requirement is therefore not between the input/output pins and the central processing units, but is rather between the decompressed data source and the remainder of the processor. For graphics processing, the highest data bandwidth requirement is between the geometry decompressor 104 and the split register file 216. For video decompression, the highest data bandwidth requirement is internal to the split register file 216. Data transfers between the geometry decompressor 104 and the split register file 216 and data transfers between various registers of the split register file 216 can be wide and run at processor speed, advantageously delivering a large bandwidth.

The register file 216 is a focal point for attaining the very large bandwidth of the processor 100. The processor 100 transfers data using a plurality of data transfer techniques. In one example of a data transfer technique, cacheable data is loaded into the split register file 216 through normal load operations at a low rate of up to eight bytes per cycle. In another example, streaming data is transferred to the split register file 216 through group load operations which transfer thirty-two bytes from memory directly into eight consecutive 32-bit registers. The processor 100 utilizes the streaming data operation to receive compressed video data for decompression.

Compressed graphics data is received via a direct memory access (DMA) unit in the geometry decompressor 104. The compressed graphics data is decompressed by the geometry decompressor 104 and loaded at a high bandwidth rate into the split register file 216 via group load operations that are mapped to the geometry decompressor 104.

Load operations are non-blocking and scoreboarded so that a long latency inherent to loads can be hidden by early scheduling.

General purpose applications often fail to exploit the large register file 216. Statistical analysis shows that compilers do not effectively use the large number of registers in the split register file 216. However, aggressive in-lining techniques that have traditionally been restricted due to the limited number of registers in conventional systems may be advantageously used in the processor 100 to exploit the large number of registers in the split register file 216. In a software system that exploits the large number of registers in the processor 100, the complete set of registers is saved upon the event of a thread (context) switch. When only a few registers of the entire set of registers is used, saving all registers in the full thread switch is wasteful. Waste is avoided in the processor 100 by supporting individual marking of registers. Octants of the thirty-two registers can be marked as "dirty" if used, and are consequently saved conditionally.

In various embodiments, the split register file 216 is leveraged by dedicating fields for globals, trap registers, and the like.

Figure 4:
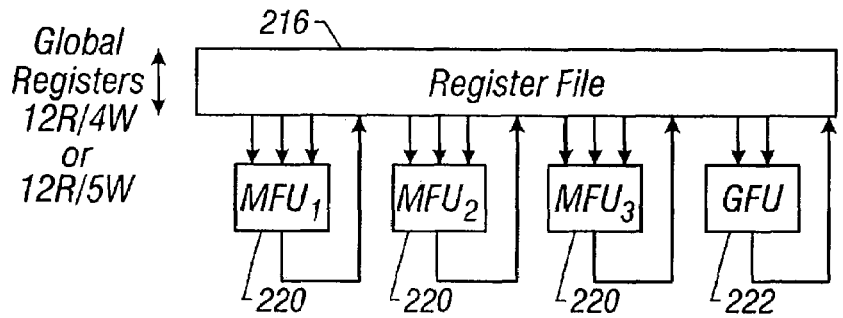
FIG. 4 is a schematic block diagram that shows a logical view of the register file and functional units in the processor.

Referring to FIG. 4, a schematic block diagram shows a logical view of the register file 216 and functional units in the processor 100. The physical implementation of the core processor 100 is simplified by replicating a single functional unit to form the three media functional units 220. The media functional units 220 include circuits that execute various arithmetic and logical operations including general-purpose code, graphics code, and video-image-speech (VIS) processing. VIS processing includes video processing, image processing, digital signal processing (DSP) loops, speech processing, and voice recognition algorithms, for example.

Figure 5:
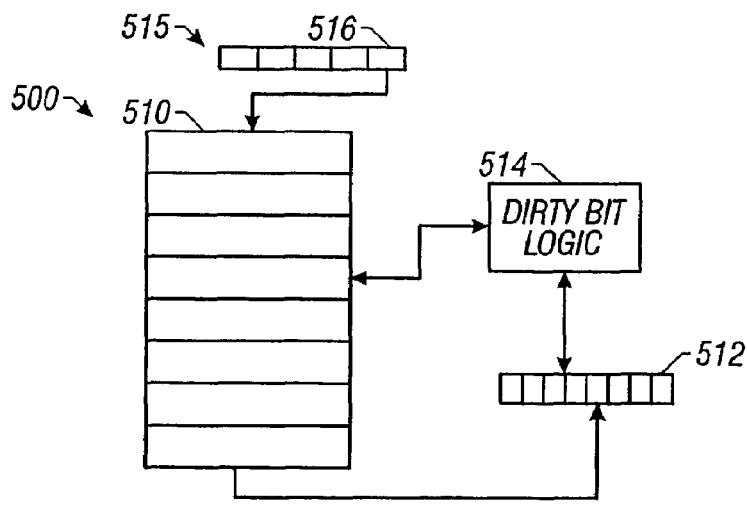
FIG. 5 is a schematic block diagram illustrating one example of a context switch controller including a register file and dirty bit structures including a dirty bit storage and a dirty bit logic.

Referring to FIG. 5, a schematic block diagram illustrates one embodiment of a context switch controller 500 including a register file 510 and dirty bit structures including a dirty bit storage 512 and a dirty bit logic 514. In the illustrative example, an instruction register 515 stores a destination register (rd) field 516 is an eight-bit field that is used to address 256 registers in the register file 510. The dirty bit logic 514 accesses the three most significant bits of the rd field 516, thereby classifying the 256 registers of the register file 510 into eight groups, called octants, of 32-register segments. A register file 510 segmented using the upper three bits of the rd field 516 is classified into eight octants including octants 1 through 7 containing addresses 0-31, 32-63, 64-95, 96-127, 128-159, 160-191, 192-223, and 224-255, respectively.

The large register file 510, which operates as an executive storage, uses the dirty bit storage 512 and the dirty bit logic 514 to control context switching of the processor 100. In an illustrative embodiment, the dirty bit storage 512 is a dirty bit register that holds an access history of registers in the register file 510. The dirty bit logic 514 controls setting and resetting of bits in the dirty bit storage 512.

The dirty bit logic 514 monitors various data load and data store instructions executed by the general functional unit 222 to determine whether a register or group of registers in the register file 510 has been written since an executing process was loaded or since the context was last restored. If the register or register group has been written, the dirty bit logic 514 generates a value in the dirty bit storage 512 that designates the written condition of the register or group of registers. The next time the processor context is saved, the dirty bit logic 514 saves a particular register or group of registers when the dirty bit storage 512 indicates that a register or group of registers was written. If the register or group of registers was not written, the context is switched without saving the register or group of registers. The dirty bit storage 512 is initialized when an executable process is loaded or the context changes.

The illustrative dirty bit logic 514 accesses a destination register (rd) field of an instruction and classifies the destination register rd according to the address in the rd field. The classification corresponds to a bit in the dirty bit storage 512 and the bit is evaluated by setting or resetting to designate that the particular classification includes a register that is written by the instruction. In one example, a dirty bit is asserted when a register is write-accessed.

In the illustrative embodiment, the processor 100 includes the dirty bit storage 512, the dirty bit logic 514, and the multi-ported register file 510 that is divided into a plurality of separate register file segments. The register file segments are associated to one of the plurality of functional units. In some embodiments, the register file segments are partitioned into local registers and global registers (shown hereinafter). The dirty bit logic 514 accesses a destination register (rd) field 516 of an instruction register 515 and classifies the destination register rd 516 according to the address in the rd field. The classification corresponds to a bit in the dirty bit storage 512 and the bit is evaluated to designate that the particular classification includes a register that is written by the instruction. In one example, the dirty bit logic 514 classifies the register file into several groups of registers including a plurality of register groups within the global register range and one or more register groups in the individual local register groups. In another example, the dirty bit logic classifies the register file 510 into a plurality of registers including a plurality of register groups within the global register range and one register group that includes all of the local register groups.

Figure 6:
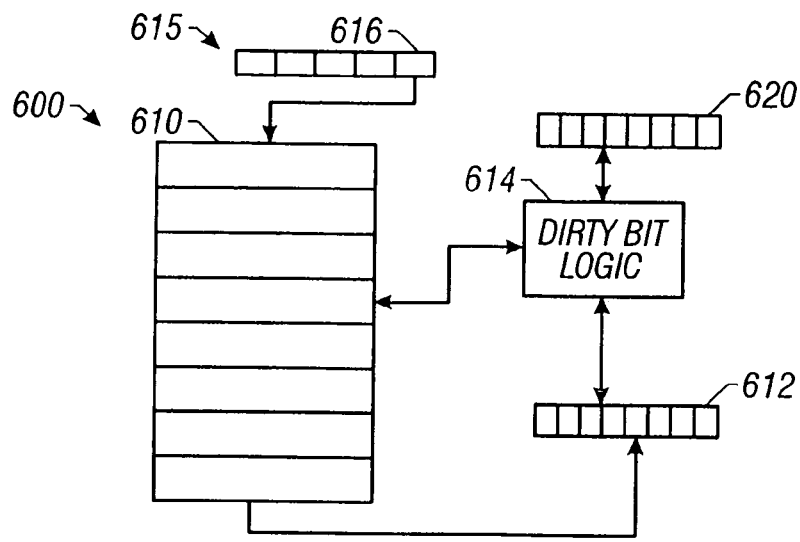
FIG. 6 is a schematic block diagram illustrating one example of a context switch controller utilizing a dirty bit enable storage in combination with a register file and dirty bit structures including a dirty bit storage and a dirty bit logic.

Referring to FIG. 6, a schematic block diagram illustrates an embodiment of a context switching controller 600 that includes a dirty bit enable storage 620 in combination with the register file 610 and dirty bit structures including a dirty bit storage 612 and a dirty bit logic 614 that controls resetting of the dirty bit storage 612. The dirty bit logic 614 determines whether a register or group of registers in the register file 610 has been written since the context was last restored. If the register or group was written, the dirty bit logic 614 generates a value in the dirty bit storage 612 that designates the written condition of the register or group of registers. When the context is next saved, the dirty bit logic 614 saves a particular register or group of registers when the dirty bit storage 612 indicates that a register or group of registers was written. The dirty bit enable storage 620 is used to enable or disable the dirty bit operation on a group-by-group basis within the register file 610. The dirty bit enable storage 620 has a bit that corresponds to each of the bits in the dirty bit storage 612. The dirty bit enable storage 620 has bit values that are programmed to disable or enable access to the register or group of registers that correspond to each bit.

The dirty bit enable storage 620 is initialized prior to operation. In some embodiments, the dirty bit enable storage 620 is a privileged register that is written only by privileged software to enable or disable segments of the register file 610. The dirty bit logic 614 detects accesses of the designated register groups to allow or disallow particular types of accesses. In an illustrative embodiment, the dirty bit logic 514 detects both read and write accesses directed to the register or register groups. Other embodiments may detect write accesses alone. Still other embodiments may detect only read accesses.

If the dirty bit enable storage 620 bit values enable access to the register or register groups, the access is allowed. Otherwise, access to the register or register group is disabled and the dirty bit logic 514 responds to either read or write accesses by generating a trap or exception for servicing by the processor 100.

Figure 7:
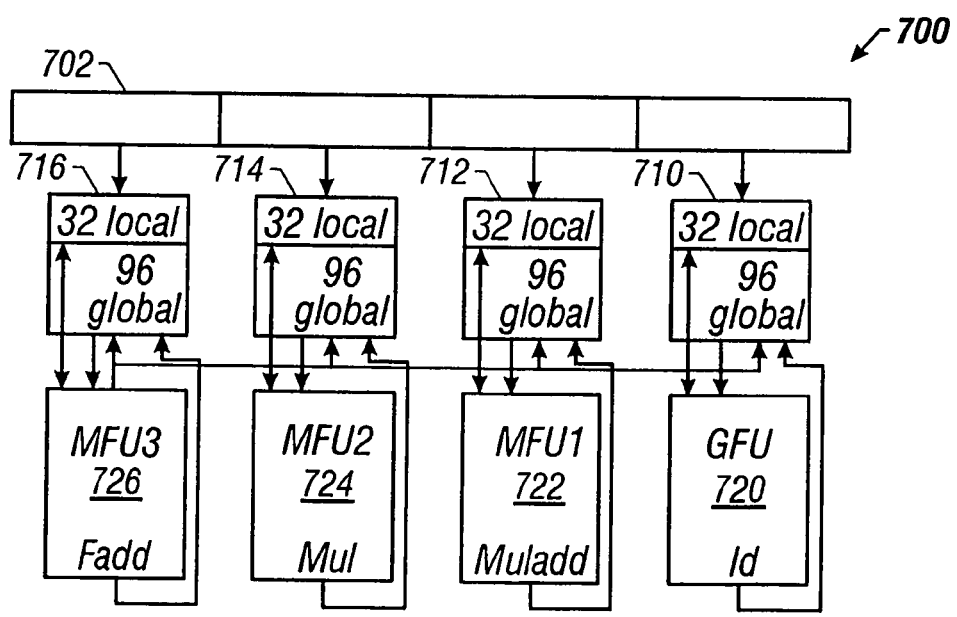
FIG. 7 is a schematic block diagram showing a register file for a VLIW processor that includes global and local register partitioning.

Referring to FIG. 7, a schematic block diagram shows a register file 700 for a VLIW processor 100 that includes global and local register partitioning. The Very Long Instruction Word (VLIW) processor has a plurality of functional units including three media functional units 722, 724, and 726, and a general functional unit 720. The processor 100 also includes a multi-ported register file 700 that is divided into a plurality of separate register file segments 710, 712, 714, and 716, each of the register file segments being associated to one of the plurality of functional units. The register file segments 710, 712, 714, and 716 are partitioned into local registers and global registers. The global registers are read and written by all functional units 710, 712, 714, and 716. The local registers are read and written only by a functional unit associated with a particular register file segment. The local registers and global registers are addressed using register addresses in an address space that is separately defined for a register file segment/functional unit pair including register file segment 710/general functional unit 720, register file segment 712/media functional unit 722, register file segment 714/media functional unit 724, and register file segment 716/media functional unit 726.

The global registers are addressed within a selected global register range using the same register addresses for the plurality of register file segment/functional unit pairs, for example, global registers 0-95. The local registers in a register file segment are addressed using register addresses in a local register range outside the global register range, for example addresses 96-127, that are assigned within a single register file segment/functional unit pair. Register addresses 96-127 applied to the register file segments in the local register range are the same for the plurality of register file segment/functional unit pairs and address registers locally within a register file segment/functional unit pair. The register specifiers of the local registers, as defined external to processor, do not overlap but instead have distinct and different specifiers. For example, in one embodiment, external to the processor 100, the 96 global registers are addressed using address specifiers 0-95 in all of the four register file segments. Local registers 96-127 in the register file segment 710, local registers 128-159 in register file segment 712, local registers 160-191 in register file segment 714, and local registers 192-223 in register file segment 716 are all addressed using register addresses 96-127. In this example, the total number of distinct and independent registers is 96+(4*32)=224. The 224 registers are addressed using 7 bits that define an address space from 0-127, rather than the 8 bits that are otherwise required to access 224 registers.

One address bit is thus saved for each of the four subinstruction positions, a savings of four bits per subinstruction and a savings of 16 bits per VLIW instruction. The reduction in address bits is highly advantageous in a VLIW processor that includes powerful functional units that execute a large plurality of instructions, each of which is to be encoded in the VLIW instruction word.

In general embodiments, the register file 700 includes N physical registers. The N-register register file 700 is duplicated into M register file segments 710, 712, 714, and 716, each having a reduced number of read and/or write ports in comparison to a nonduplicated register file, but each having the same number of physical registers. The register file segments are partitioned into $N_G$ global and $N_L$ local register files where $N_G$ plus $N_L$ is equal to N. The register file operates equivalently to having $N_G+(M*N_L)$ total registers available for the M functional units. The number of address bits for addressing the $N_G+(M*N_L)$ total registers remains equal to the number of bits B that are used to address $N=2^B$ registers. The local registers for each of the M register file segments are addressed using the same B-bit values.

In some embodiments, partitioning of the register file 700 is programmable so that the number $N_G$ of global registers and number $N_L$ of local registers is selectable and variable. For example, a register file including four register file segments each having 128 registers may be programmably configured as a flat register file with 128 global registers and 0 local registers with the 128 registers addressed using seven address bits. Alternatively, the four register file segments may be programmably configured, for example, to include 64 global registers and 64 local registers so that the total number of registers is 64+(4*64)=320 registers that are again addressed using 7 bits rather than the 9 bits that would otherwise be required to address 320 registers.

Referring to FIGS. 8A, 8B, 8C, and 8D, respective schematic block diagrams illustrate the pipeline control unit 226 segments allocated to all of the functional units GFU, MFU1, MFU2, and MFU3. The pipeline control unit 226 imposes several scheduling rules that apply to bypass between instructions in a single VLIW group. Full bypass is implemented between instructions executed by functional units GFU and MFU1 so that bypass rules are identical for bypass from results of pair instructions in MFU1 to more recently issued instructions executed in the GFU and MFU1 functional units. For other cases, an additional one cycle penalty is imposed for bypass from a pair instruction to more recently issued instructions in other groups. The scheduling rules are imposed by control units allocated to the general functional unit 222 and the media functional units 220. A pcu_gf control unit (pcu_gf_ctl 810) is the control block for instructions executing in the general functional unit 222. Similarly, pcu_mf1_ctl 820, pcu_mf2_ctl 822, and pcu_mf3_ctl 824 are control blocks for mfu1, mfu2, and mfu3, respectively. The pcu/ functional unit control blocks generate D-stage stalls, generate D-stage bypasses for "alu_use_immediate" cases and for generating multiplexer select signals for E-stage bypasses. The control blocks for the various functional units are positioned adjacent to the scoreboard datapath associated to the particular functional unit. The pcu control units include a partial decoder, such as gfu partial decoder 830 and mfu partial decoders 832, 834, and 836.

The pipeline control unit 226 also include a plurality of internal registers (ir), many of which are not accessible by a user. One internal register of the pipeline control unit 226 is a processor control register (PCR) that controls power management, instruction and data cache enables, pipeline enable, and branch predict taken enable.

The pcu control units perform various functions including qualifying scoreboard hits with immediate bits, sending operation type signals to the load/store unit 218, and handling various instructions including getir, setir, sethi, jmpl, membar, and prefetch. Signals generated by the decoder include a gfu_imm signal that designates whether source rs2 is immediate, a gfu_load signal that designates whether a gfu instruction is a load, a gfu_ldg signal that identifies whether the instruction is a group load, and a gfu_ldpair signal that designates whether the instruction is a paired instruction within a load pair. Generated signals further include a gfu_store signal that identifies a store instruction, a gf_stpair signal the indicates whether the gfu instruction is a store pair instruction, and a gfu_cas signal which indicates that the gfu instruction is a cas instruction. A gfu_prefetch signal indicates the gfu instruction is a prefetch. A gfu_call signal designates a call instruction with r2 as a destination specifier. A gfu_branch signal designates a branch instruction with the rd field as a source specifier. The gfu_nop signal designates a nop. A gfu_illegal signal identifies an illegal instruction. A gfu_privilege signal designates a privileged instruction. A gfu_sir signal indicates a software initiated reset instruction. A gfu_softrap signal identifies a softrap instruction. Signals including gfu_sethi, gfu_setlo, and gfu_addlo designate sethi instructions. A gfu_long signal indicates a long latency instruction. Signals including gfu_setir, gfu_getir, gfu_setir_psr, and gfu_memissue respectively designate setir, getir, setir to PSR, and membar instructions.

The pcu_gf_ctl 810 generates D-stage and E-stage stalls of the general functional unit 222, generates signals to hold the D-stage of the gfu instruction, source, and destination operands.

The pcu_gf_ctl 810 controls full bypass between the general functional unit 222 (gfu) and the media functional unit 220 (mfu1). The pcu_gf_ctl 810 generates bypass signals in several circumstances. An ALU use immediate bypass is generated if any of the source specifiers of the gfu instruction depends on the results of an immediately preceding 1 cycle gfu or mfu1 instruction. If a source specifier of any gfu instruction in E-stage awaits load data, then the pcu_gf_ctl 810 asserts appropriate select signals to select the data returning from either the load/store unit 218 or the data cache 106. If the source specifier of any gfu instruction in D-stage is dependent on a previous long latency instruction, then the pcu_gf_ctl 810 asserts appropriate select signals to select the long latency data. If an E-stage stall occurs and any source operand is not dependent on a load data return, then the pcu_gf_ctl 810 asserts appropriate signals to hold the data the source operand has already bypassed.

The pcu_mf1_ctl 820 is similar to the pcu_gf_ctl 810 and performs functions including partial decoding of the mfu1 instruction to supply and maintain the D-stage opcode of the mfu1 instructions. The pcu_mf1_ctl 820 generates all stalls of the mfu1 instruction and recirculating the D-stage mfu1 instruction. The pcu_mf1_ctl 820 generates bypass selects for mfu1 instructions and sends load dependency information to the mfu1 annex so that the annex selects a proper bypass if the instruction is stalled in D-stage with load dependency. The pcu_mf1_ctl 820 detects bypasses for ALU-use immediate cases and generates the inherent second instruction of a paired mfu1 instruction. The mf1 also generates synchronizing stalls for mfu instructions.

In the illustrative embodiment, pcu_mf2_ctl 822 and pcu_mf3_ctl 824, control blocks for mfu2 and mfu3 instructions, are the identical but differ from pcu_mf1_ctl 820 because full bypass is not supported between mfu2/mfu3 and gfu.

The pipeline control unit 226 supports full bypass between the general functional unit 222 and MFU1 of the media functional units 220. Thus results of instructions executed in MFU1 are available in the same cycle to instructions in the D-stage in GFU and MFU1 units. However, results of instructions executed in MFU2 and MFU3 are available to the GFU and MFU1 functional units only after results enter the T-stage. Specifically, a GFU instruction that uses the result of a one, two or four-cycle MFU2 instruction has to be at least five cycles later. GFU and MFU1 instructions have a two-cycle best case load-use penalty. MFU2 and MFU3 instructions have a three-cycle best case load-use penalty. A GFU instruction having an output dependency with a previous load and the load is a data cache hit returning data in the A1-stage has a three cycle penalty.

Figure 8A:
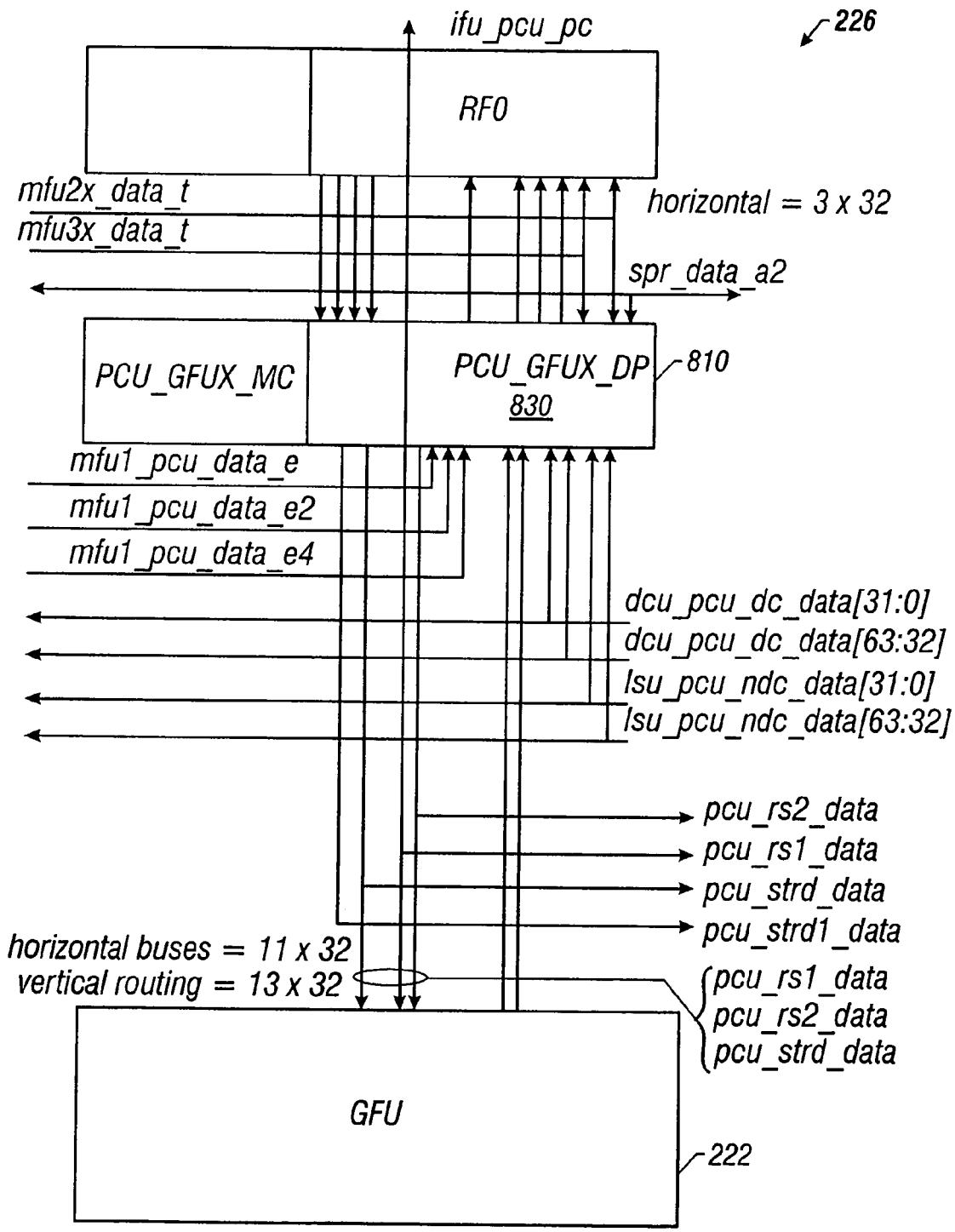
FIGS. 8A, 8B, 8C, and 8D are respective schematic block diagrams illustrating the pipeline control unit segments allocated to all of the functional units GFU, MFU1, MFU2, and MFU3.
Figure 8B:
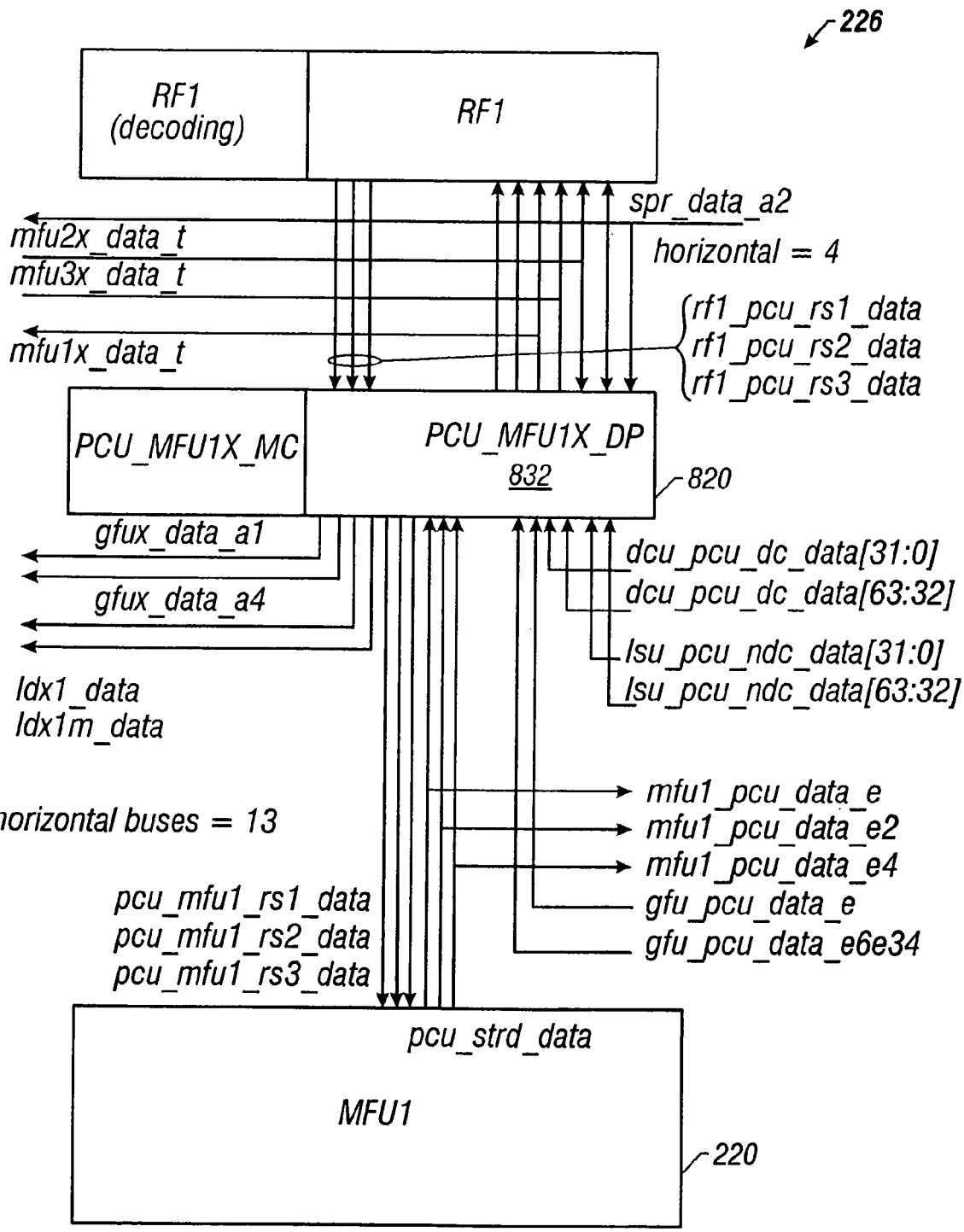
Figure 8C:
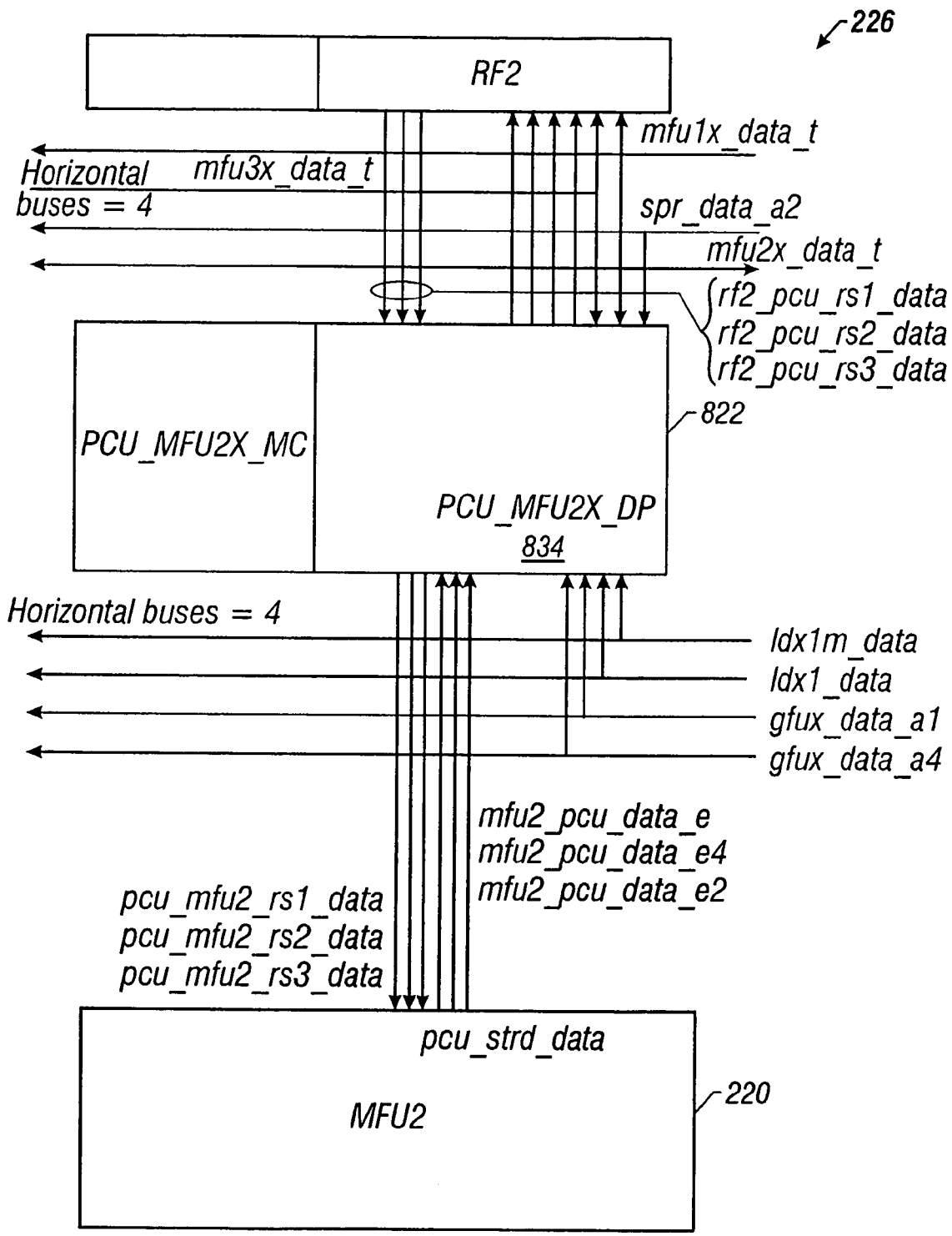
Figure 8D:
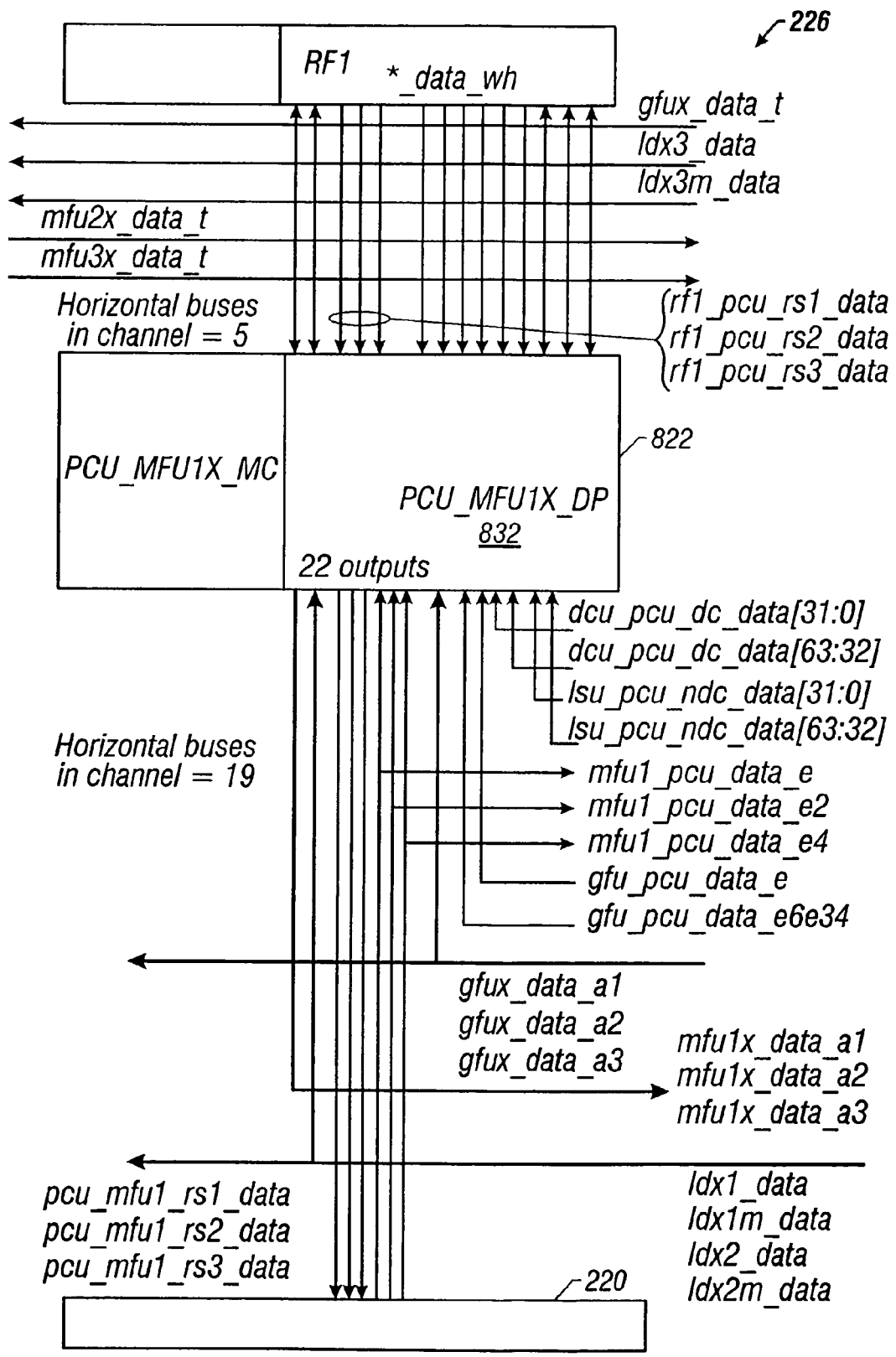

All pipeline stages from which the source operands of a GFU instruction bypass data are maintained in a pipeline control unit—general functional unit interface 810 shown in FIG. 8A. Similar interfaces are included for each of the media functional units 220, MFU1, MFU2, and MFU3 shown in FIGS. 8B, 8C, and 8C, respectively.

The pipeline control unit 226 includes a plurality of registers that are read and written using get internal register (getir) and set internal register (setir) instructions, respectively. The getir instruction and the setir instruction are instructions that are executed in the general functional unit 222.

The set internal register (setir) instruction is a common format instruction that is implemented in all functional units. The setir instruction has the format:

setir rs2_imm, IR.

The setir instruction that is implemented in media functional units 220 reads only internal registers (GX and FSR) that are local to the functional unit. The setir instruction is not a privileged instruction. However, if a setir instruction is applied to a privileged internal register in user mode, then the privileged exception is taken. The setir instruction writes the contents of register specifier rs2 or the immediate field into the internal register having an IR number specified in a destination register (rd) field of the instruction.

The setir instruction has a latency of six and updates an internal register at the end of write-back stage so that any instruction that uses the result of the setir instruction is to be at least five cycles subsequent to the setir instruction. The five cycle spacing rule has several exceptions including setir instructions applied to ASI, FMT, and DIRTY registers, which are accessible to instructions in the immediately following cycle. Immediate accessibility of the fast-updating ASI, FMT, and DIRTY setir instructions is accomplished by updating the internal registers in an execute (E) stage and saving the previous register value in a history register. If a trap occurs before the setir instruction reaches the writeback stage, the internal register is restored to the history register value. However, immediately sequential setir instructions to the same fast-updating internal register are prohibited. Setir instructions to the same fast-updating internal register are to be at least five cycles apart.

The get internal register (getir) instruction has the format:

getir [rs2]_imm, rd.

The getir instruction reads a value from the specified internal register and stores the value in the specified destination register rd. The getir instruction is a four cycle latency instruction for all functional units. Any instruction that uses data accessed via the getir instruction is to be at least four cycles subsequent to the getir instruction. The internal register specifier for the getir instruction is selected from either a 7-bit immediate value or bits [6:0] of the source register rs2.

Referring to FIG. 9, a table lists the internal registers of the pipeline control unit 226. Only internal registers TICK, FMT, DIRTY, and FSR are readable in user mode. Only internal registers FMT, DIRTY, and FSR are writeable in user mode. All GX registers are read-only and are not written in wither user mode or privilege mode.

Referring to FIG. 10, a table shows contents of a Processor Control Register (PCR). The PCR is not part of the thread state of the processor 100. The PCR register is read in user mode. The user is not permitted to write the PCR register.

A Branch Predict Taken Enable (BTPE) bit of the PCR register is cleared after a watchdog reset (WDR) or a power-on-reset (POR) reset. All branches are predicted not taken. If the branch is resolved to be taken, the pipeline control unit 226 asserts a mispredict condition to an instruction fetch unit (IFU) (not shown). The BTPE bit effectively prevents speculative fetching from a branch target address.

A memory step (MSTEP) bit of the PCU register, when asserted, causes any instruction that executes in the load/store unit 218 to wait in an execute (E) stage until load buffers and store buffers are empty. Instructions that are affected by the MSTEP bit include loads, stores, the setir instruction, prefetch, cas, and swap, for example. The MSTEP bit and functionality allow only one operation to be present in the load/and store buffers at any time. The MSTEP bit is deasserted during reset of the processor 100. Referring to FIGS. 11A and 11B, an instruction table and a pipeline diagram respectively show operation of the processor 100 while instructions that affect the MSTEP bit are executed. Prior to the pipeline operations shown in FIG. 11B, both the load buffer and the store buffer of the load/store unit 218 are empty before the first setir instruction is issued. The load/store unit 218 asserts a buffer empty bit "lsu_pcu_ldst_buff_empty". When the load/store unit 218 detects the load operation in E-stage in cycle 3 1114, the load/store unit 218 deasserts the "lsu_lpcu_ldst_buff_empty" bit late in cycle 7 1122. Subsequently, a ld_6 operation 1150 stalls in E-stage if the "lsu_psu_ldst_buff_empty" remains deasserted during cycles 7 1122 and 1124.

A Pipeline Enable (PE) bit allows only one VLIW instruction word to pass through the pipelines. Execution of a second VLIW instruction word does not begin until the first VLIW instruction word finishes when the PE bit is set. The second VLIW instruction word receives source operands from the register file 600 and does not bypass any data from the annexes. Referring to FIGS. 12A and 12B, an instruction table and pipeline diagram illustrate operation of the Pipeline Control Register PE bit. The pipeline control unit 226 performs the pipeline enable functionality by monitoring valid bits from the execute (E) stage to the write-back stage of gfu instructions and also monitoring valid_bits of the load annex (ldx), the long-latency entry in the scoreboard, and the "lsu_pcu_ldst_buff_empty" bitline from the load/store unit 218. The processor 100 enters Step Mode after reset. Step Mode is also set and reset through usage of the setir instruction.

The setir instruction in vliw_1 asserts the PE bit of the PCR in the writeback (WB) stage of the setir instruction in cycle 2 1212. Subsequently, a vliw_7 group enters a debug mode in cycle 7 1222. A setir instruction in vliw_9 deasserts the PE bit of the PCR in cycle 23 1254 so that instructions in vliw_11 terminate the Step Mode.

A processor identification (PID) is hardwired into the processor control register for each processor 100.

Referring to FIG. 13, a table illustrates entries of a dirty register 1300. In the illustrative embodiment, the dirty register 1300 is a six-bit register that designates access to segments of the register file 600. Registers 0-31 of the register file 600 are always assumed to be dirty and therefore have no assigned dirty bit. Local registers of the individual functional units set different bits in the dirty register 1300.

The dirty register 1300 is updated in the execute (E) stage of the instruction that writes to a register (a "clean" register) that has not been accessed since dirty bits were reset. A setir instruction to the dirty register 1300 also updates the dirty register 1300 during the E-stage while holding the previous dirty register value in a history dirty register (not shown). If a trap occurs before the setir instruction reaches the trap (T) stage, then the dirty register 1300 has values restored to the stored history dirty register values. Instructions that execute in the media functional units 220 that are in the same VLIW instruction word as a setir instruction accessing the dirty register 1300 are prohibited from writing to new sections of the register file 600.

Figure 14:
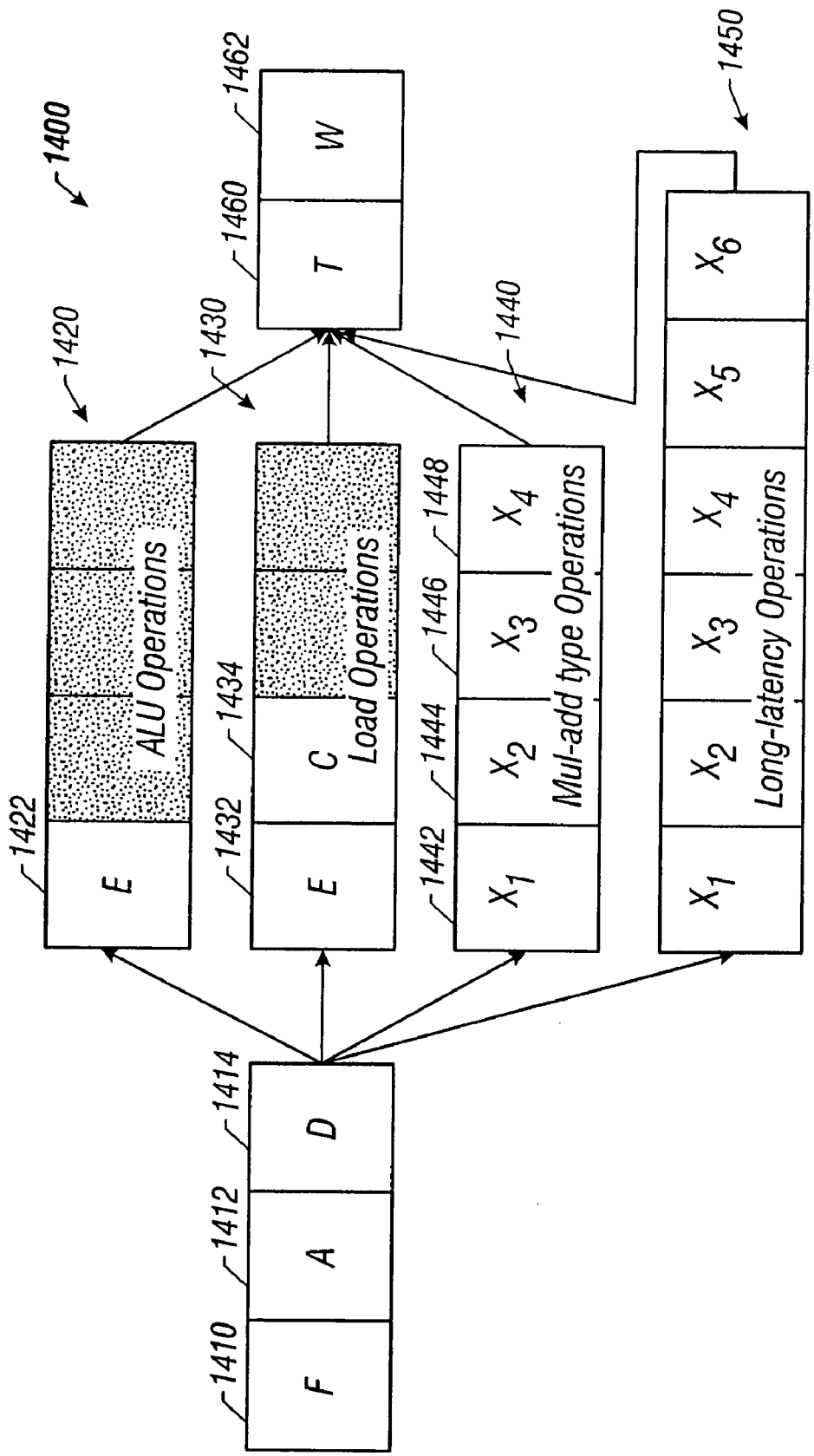
FIG. 14 is a schematic timing diagram that illustrates timing of the processor pipeline.

Referring to FIG. 14, a simplified schematic timing diagram illustrates timing of the processor pipeline 1400. The pipeline 1400 includes nine stages including three initiating stages, a plurality of execution phases, and two terminating stages. The three initiating stages are optimized to include only those operations necessary for decoding instructions so that jump and call instructions, which are pervasive in the Java™ language, execute quickly. Optimization of the initiating stages advantageously facilitates branch prediction since branches, jumps, and calls execute quickly and do not introduce many bubbles.

The first of the initiating stages is a fetch stage 1410 during which the processor 100 fetches instructions from the 16 Kbyte two-way set-associative instruction cache 210. The fetched instructions are aligned in the instruction aligner 212 and forwarded to the instruction buffer 214 in an align stage 1412, a second stage of the initiating stages. The aligning operation properly positions the instructions for storage in a particular segment of the four register file segments 310, 312, 314, and 316 and for execution in an associated functional unit of the three media functional units 220 and one general functional unit 222. In a third stage, a decoding stage 1414 of the initiating stages, the fetched and aligned VLIW instruction packet is decoded and the scoreboard (not shown) is read and updated in parallel. The four register file segments 310, 312, 314, and 316 each holds either floating-point data or integer data. The register files are read in the decoding (D) stage.

Following the decoding stage 1414, the execution stages are performed. The two terminating stages include a trap-handling stage 1460 and a write-back stage 1462 during which result data is written-back to the split register file 216.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims. For example, although the processor is described as a VLIW processor, other suitable processors may also utilize the described and claimed technique for efficiently using a storage. In addition, the described structure and operating method may be applied to a register file and processor of any suitable size. The register file may be much larger or much smaller than the described 128 registers. The very long instruction word may include any suitable number of subinstructions.

What is claimed is:

1. A multi-threaded processor comprising:
a pipeline control unit;
a plurality of functional units;
a context switch controller comprising a register file, dirty bit storage, and dirty bit logic;
wherein the pipeline control unit transfers each instruction to one of the functional units,
the register file comprises a plurality of register file segments,
each register file segment is associated to one of the functional units,
each register file segment comprises a plurality of registers,
the dirty bit storage stores a status of the registers,
the dirty bit logic sets a status indicating one of more of the registers has been updated since a last context switch, and
the context switch controller selectively saves one or more of the registers based on the status in the event of a context switch.

2. The multi-threaded processor of claim 1, wherein the context switch controller selectively restores one or more of the registers based on the status in the event of the context switch.

3. The multi-threaded processor of claim 1, wherein the context switch controller selectively foregoes saving one or more of the registers based on the status in the event of the context switch.

4. The multi-threaded processor of claim 1, wherein the dirty bit storage is initialized when an executable process is loaded or the context changes.

5. The multi-threaded processor of claim 1, wherein each register file segment is partitioned into local registers and global registers.

6. The multi-threaded processor of claim 5, wherein the global registers are read and written by all functional units.

7. The multi-threaded processor of claim 5, wherein the local registers are read and written only by the functional unit associated with a particular register file segment.

8. The multi-threaded processor of claim 1, wherein the functional units comprise a general functional unit and a plurality of media functional units.

9. The multi-threaded processor of claim 1, wherein each register is comprised of a plurality of octants.

10. The multi-threaded processor of claim 9, wherein the dirty bit storage stores a status of one or more octants, the dirty bit logic sets a status indicating one of more of the octants has been updated since a last context switch, and the context switch controller selectively saves one or more of the octants based on the status in the event of a context switch.

11. A context switch controller of a multi-threaded processor comprising
a register file;
dirty bit storage; and
dirty bit logic;
wherein the register file comprises a plurality of register file segments,
each register file segment is associated to one of a plurality of functional units,
each register file segment comprises a plurality of registers,
the dirty bit storage stores a status of the registers,
the dirty bit logic sets a status indicating one of more of the registers has been updated since a last context switch, and
the context switch controller selectively saves one or more of the registers based on the status in the event of a context switch.

12. The context switch controller of claim 11, wherein the context switch controller selectively restores one or more of the registers based on the status in the event of the context switch.

13. The context switch controller of claim 11, wherein the context switch controller selectively foregoes saving one or more of the registers based on the status in the event of the context switch.

14. A method for efficiently executing a context switch in a multi-threaded processor comprising:
- initializing a status of one or more of a plurality of registers in the event of a context change wherein the status indicates one of more of the registers has been updated since a last context switch;
- storing the status of one or more of the registers upon a write access;
- selectively saving one or more of the registers based on the status in the event of a next context switch; and
- selectively restoring one or more of the registers upon the next context switch;
- wherein a register file comprises a plurality of register file segments, each register file segment is associated to one of a plurality of functional units, each register file segment comprises the registers.

15. The method of claim 14, wherein the saving foregoes saving one or more of the registers based on the status in the event of the next context switch.

16. The method of claim 14, wherein the saving saves a portion of the registers based on the status in the event of the next context switch.

* * * * *